US005530234A

United States Patent [19]
Loh et al.

[11] Patent Number: 5,530,234
[45] Date of Patent: Jun. 25, 1996

[54] HAND HELD CALCULATOR HAVING A RETRACTABLE COVER

[75] Inventors: Philip K. N. Loh; Soo H. Quek, both of Singapore, Singapore

[73] Assignee: Hewlett-Packard Company, Palo Alto, Calif.

[21] Appl. No.: 370,759

[22] Filed: Dec. 23, 1994

[51] Int. Cl.⁶ .................................................... G10F 1/02
[52] U.S. Cl. ............................... 235/61 R; 235/1 D
[58] Field of Search ............................ 235/61 PL, 61 R, 235/61 S, 63 A, 63 R, 99 R, 1 R, 1 A, 1 D

[56] References Cited

U.S. PATENT DOCUMENTS

| | | | |
|---|---|---|---|
| D. 269,278 | 6/1983 | Yoshioka et al. | D18/7 |
| D. 283,137 | 3/1986 | Hamar | D18/2 |
| D. 283,138 | 3/1986 | Hamar | D18/11 |
| D. 331,400 | 12/1992 | Kelly et al. | D14/15 |
| D. 332,777 | 12/1993 | Kelly et al. | D14/100 |
| 3,961,159 | 6/1976 | Hursey | 235/61 R |
| 4,044,980 | 8/1977 | Cummins | 248/13 |
| 4,113,212 | 9/1978 | Coriden | 248/13 |
| 4,165,554 | 8/1979 | Faget | 16/114 R |
| 4,259,568 | 3/1981 | Dynesen | 235/1 D |
| 4,596,923 | 6/1986 | Kuo | 235/1 D |
| 4,703,160 | 10/1987 | Narishima et al. | 235/1 D |
| 4,746,043 | 5/1988 | Booker | 224/151 |
| 4,989,926 | 2/1991 | Snow, Jr. | 312/208 |
| 5,092,459 | 3/1992 | Uljanic et al. | 206/320 |
| 5,115,330 | 5/1992 | Nobile et al. | 359/52 |
| 5,128,829 | 7/1992 | Loew | 361/380 |

Primary Examiner—Patrick J. Stanzione

[57] ABSTRACT

A portable, hand held, electronic calculator assembly has a retractable cover slidably mounted to a calculator. The calculator has a front with a keypad and display, and a back. The cover has an inner surface and an exposed outer surface. The cover is movable relative to the calculator between a first position where the cover inner surface is juxtaposed to the calculator front, thereby protecting the keypad and display, and a second position where the cover inner surface is juxtaposed to the calculator back.

17 Claims, 6 Drawing Sheets

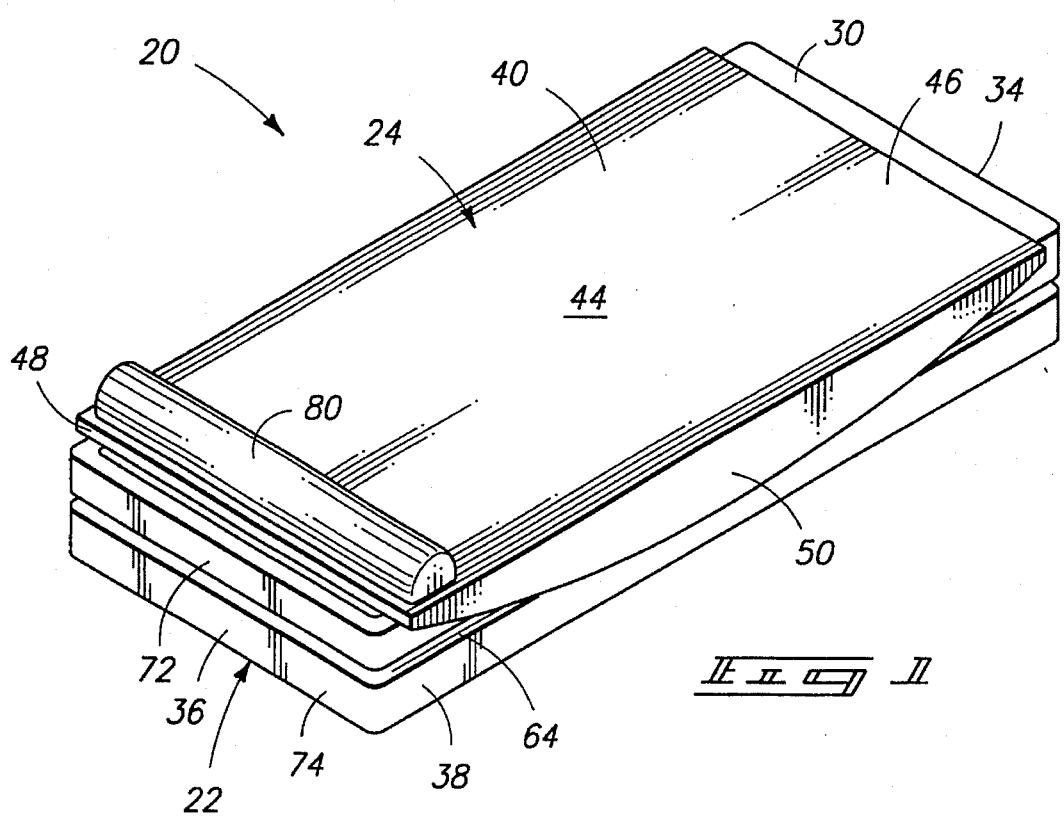
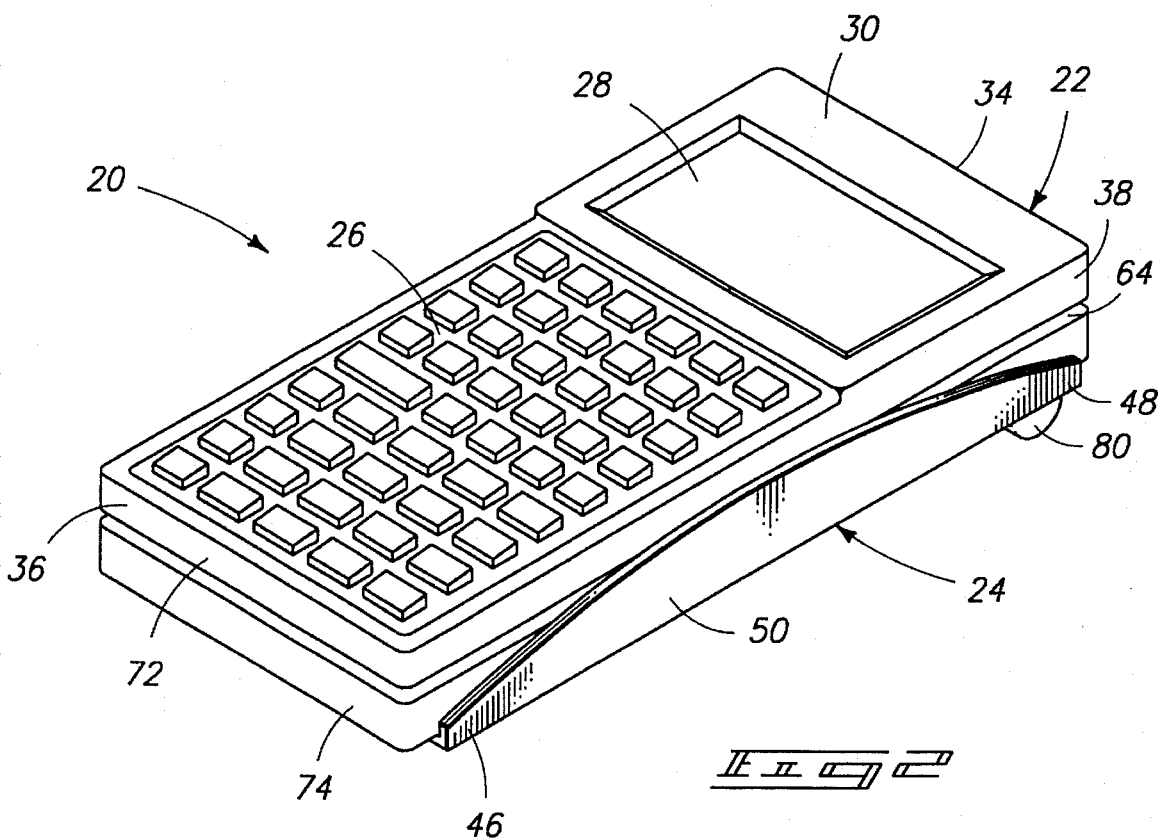

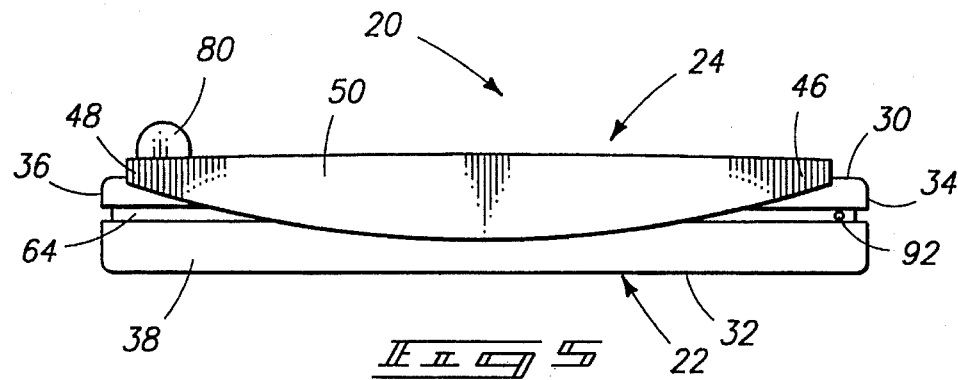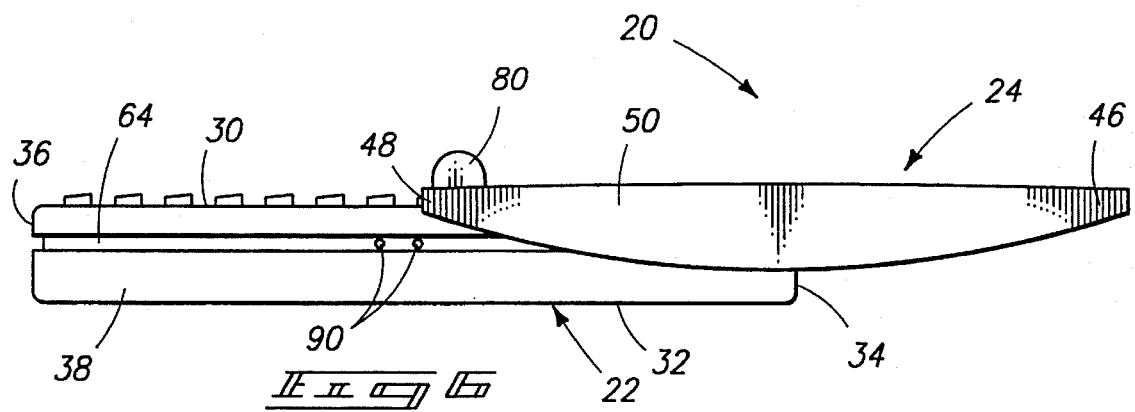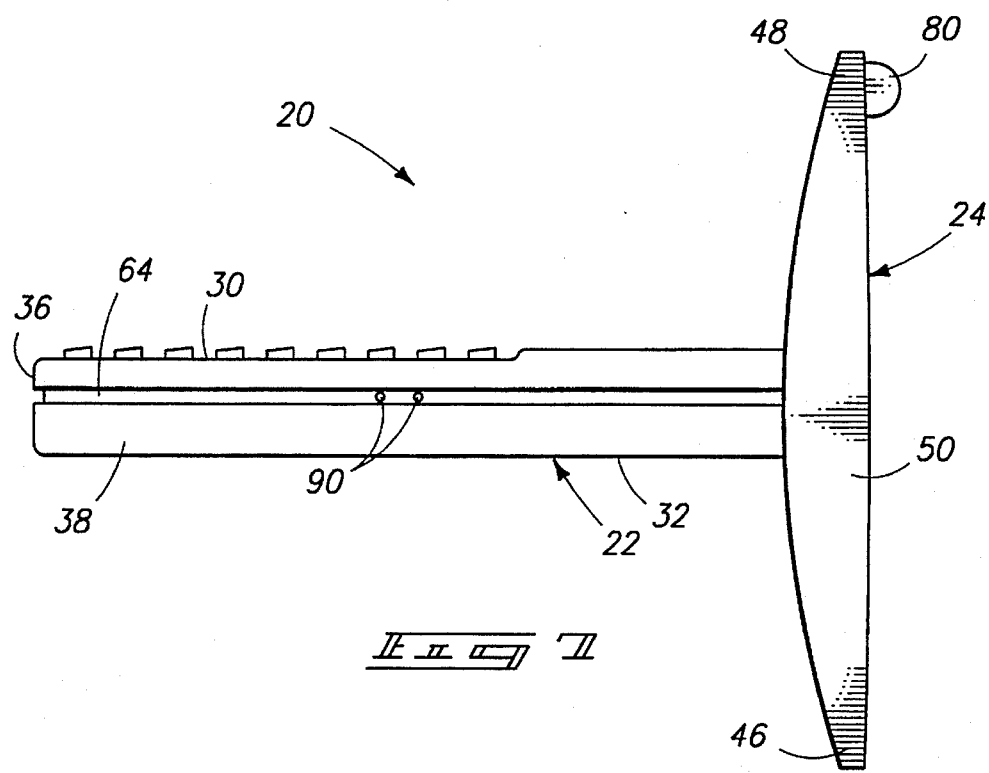

HAND HELD CALCULATOR HAVING A RETRACTABLE COVER

TECHNICAL FIELD

This invention relates to portable hand held calculators, and more particularly, to covers and supports for such calculators.

BACKGROUND OF THE INVENTION

A portable, hand held, electronic calculator is designed to be held with one hand or supported on a desk top. The calculator has a flat panel display positioned above a keypad. The display is commonly made of glass or plastic which can be scratched or broken. A separate protective casing is typically used to shelter the display and keypad when the calculator is not in use. Unfortunately, the casing can be misplaced by the user or otherwise lost, leaving the calculator vulnerable to debris, scraping, damage, or inadvertent activation of the "ON" button which, in some calculators, drains the battery supply.

SUMMARY OF THE INVENTION

According to one aspect of this invention, a portable hand held calculator assembly having an integrated calculator and protective covering is provided. The calculator has a front with a keypad and display, and a back. A retractable cover is slidably coupled to the calculator to protect the keypad and display. The cover is movable between a first position where its inner surface is juxtaposed to the calculator front, thereby protecting the keypad and display, and a second position where its inner surface is juxtaposed to the calculator back.

According to another aspect, a pair of interconnecting pins are used to slidably couple the cover to the calculator. The pins are integrally formed with the cover and slidably mounted within guide tracks formed in opposing sides of the calculator. As the cover is moved from the first position to an intermediate position, the pins slide in their respective guide tracks toward either the top or bottom ends of the calculator. At the intermediate position, the cover is pivoted about the end of the calculator. The cover can then be moved from the intermediate position to the second position whereby the pins slide in their respective guide tracks away from the end of the calculator back toward the middle. The cover is then situated in a retracted, stored position.

According to yet another aspect of this invention, the cover can be used to prop the calculator at various angles when situated at the intermediate or second positions.

BRIEF DESCRIPTION OF THE DRAWINGS

Preferred embodiments of the invention are described below with reference to the accompanying drawings, which are briefly described below.

FIG. 1 is a perspective view of a hand held calculator assembly of this invention which shows a retractable cover in a first, closed position.

FIG. 2 is a perspective view of the hand held calculator assembly which shows the cover in a second, retracted position.

FIG. 5 is a side elevation view of the hand held calculator assembly which shows the cover in a closed position.

FIG. 6 is a side elevation view of the hand held calculator assembly which shows the cover displaced relative to the calculator to an intermediate position.

FIG. 7 is a side elevation view of the hand held calculator assembly which shows the cover at the intermediate position and pivoted half-way around an end of the calculator.

DETAILED DESCRIPTION OF THE PREFERRED EMBODIMENTS

Figure 3:
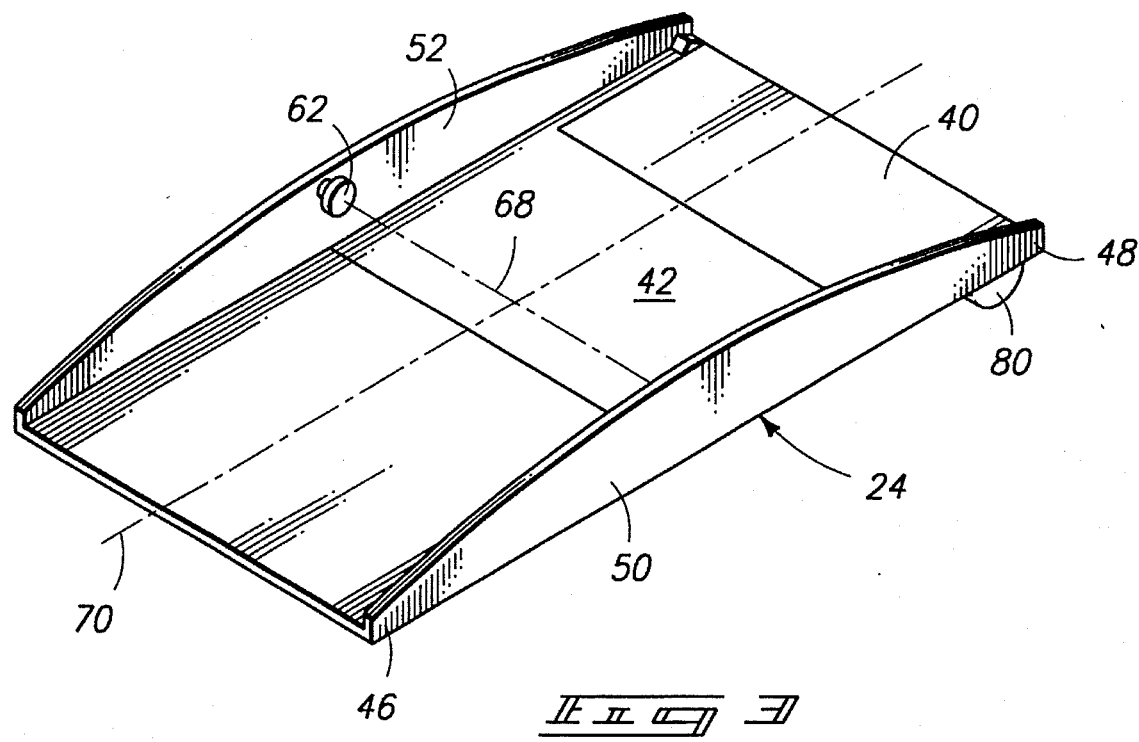
FIG. 3 is a perspective view of the retractable cover according to a preferred construction of this invention.

This disclosure of the invention is submitted in furtherance of the constitutional purposes of the U.S. Patent Laws "to promote the progress of science and useful arts" (Article 1, Section 8).

FIGS. 1 and 2 show a portable, hand held, electronic calculator assembly 20 that is constructed according to this invention. Calculator assembly 20 includes a calculator 22 and a retractable cover 24 slidably coupled to the calculator. Calculator 22 comprises a keypad 26 having individually actuatable keys arranged in a customary pattern, and a visual display 28 such as an LCD flat panel display. An "ON" button to activate the calculator is provided as part of the keypad. The calculator 22 further includes electronics coupled to the keypad and visual display, as well as an IC microprocessor chip which performs the calculating functions and a power supply (none of which are shown). Calculator 22 is of conventional design with respect to its calculator functionality and operation.

Calculator 22 has an upper face or front 30, which includes the keypad 26 and display 28, and a lower face or back 32 (not numbered in FIGS. 1 and 2, but shown in FIGS. 5–9). Calculator 22 also includes, a top end 34, a bottom end 36, and opposing sides 38 and 39 (where only side 38 is shown in FIGS. 1 and 2).

Cover 24 is movable relative to calculator 22 between a first, closed position where the cover overlies the calculator front (FIG. 1) and a second, retracted position where the cover is aligned along the calculator back (FIG. 2). When situated in the closed position, cover 24 overlies and protects substantially all of the calculator front 30. Preferably, cover 24 has a length almost equal to the length of the calculator, as shown. In this manner, the cover has a length effective to shield both the keypad 26 and display 28 when the cover is in its closed position (FIG. 1). The cover is preferably formed of a hard material to thereby prevent scraping or damage to the display, debris from the keypad, or inadvertent activation of the "ON" button of the keypad.

Figure 4:
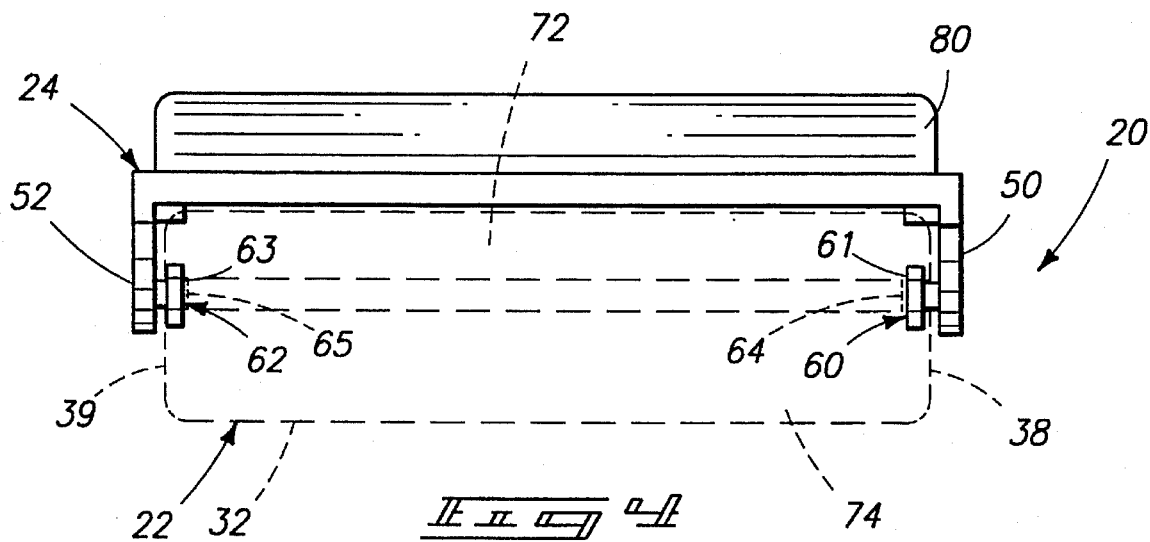
FIG. 4 is an enlarged bottom end elevation view of the cover, with the calculator shown in phantom line.

With additional reference to FIGS. 3 and 4, cover 24 has a panel 40, an inner surface 42, an exposed outer surface 44, opposing ends 46 and 48, and opposing side walls 50 and 52. Panel 40 is substantially flat, but with a very slight outward bow. It provides the protective shielding of the keypad and display. Side walls 50 and 52 extend perpendicularly from panel 40 down over sides 38 and 39, respectively, of calculator 22.

Calculator assembly 20 has an interconnection means for slidably coupling retractable cover 24 to calculator 22. The interconnection means enables movement of the cover from the closed position (FIG. 1) to the retracted open position (FIG. 2) in a manner that maintains the inner surface 42 of cover 24 in juxtaposition with the calculator 22 throughout the movement. In a preferred implementation, according to one aspect of this invention, the interconnection means comprises a pair of interconnecting pins 60 and 62 that are connected to the cover 24 and slidably mounted within respective guide tracks 64 and 65 formed in respective sides 38 and 39 of calculator 22.

Pins 60 and 62 are connected to inner surfaces of the cover side walls 50 and 52 approximately midway between opposing cover ends 46 and 48. Pins 60 and 62 are coaxially aligned along pin axis 68, substantially perpendicular to an elongated medial axis 70 defined by the calculator (FIG. 3). The pins project inwardly toward one another to slidably mount within guide tracks 64 (FIG. 4). Pins 60 and 62 include respective oversized, circular heads 61 and 63 which retain the pins laterally within the guide tracks and facilitate smooth longitudinal movement within the tracks. Preferably, pins 60 and 62 and cover 22 are integrally formed of a single unit of hard material, such as hard plastic.

As a preferred construction, calculator 22 has a calculator body comprised of an upper casing 72 and a lower casing 74 which are joined together (FIGS. 1, 2, and 3). The joint between the upper and lower body casings form guide tracks 64 and 65 which run along the sides 38 and 39, and between the top and bottom ends 34 and 36 of calculator 22. During assembly, the cover pins are first positioned on the lower guide rail of lower casing 74. The upper casing 72 is then snapped or otherwise mounted onto the lower casing 74 to provide the upper guide rail, thereby completing the guide tracks 64 and 65.

Cover 24 includes a raised support member 80 which is used to prop the calculator at an inclined angle when the cover is at the retracted position (FIG. 2). Support member 80 is mounted to outer surface 44 at end 48 of the cover. Support member 80 is preferably formed of a skid-resistant material, such as rubber or elastomer, to resist displacement of the calculator assembly when laying on a desk top.

FIGS. 5–9 show one possible technique for retracting the cover. In FIG. 5, the cover 24 is situated at a first, closed position where it overlies both the keypad and display to shield them from unwanted debris and damage. At this position, the cover inner surface 42 is juxtaposed with the calculator front. Raised detents or bumps 90 (FIG. 6) are provided within the guide tracks at the middle of the calculator to positionally urge the pins to selected locations which coincide with the closed cover position. These bumps are of sufficient size to retain the pins at the middle of the calculator until a force applied by the user overcomes the mechanical urging induced by the bumps.

To open, the cover is first moved from its closed position toward an intermediate position at one end of the calculator (FIG. 6). For purposes of discussion, assume that the cover 24 is moved to the top end 34 of the calculator 22. The pins 60, 62 are pushed past the raised bumps 90 and slid within guide tracks 64 toward the top end 34. A second set of raised detents 92 (see FIG. 5) can be provided at the top end of the guide tracks to temporarily secure the pins in this intermediate position.

Figure 8:
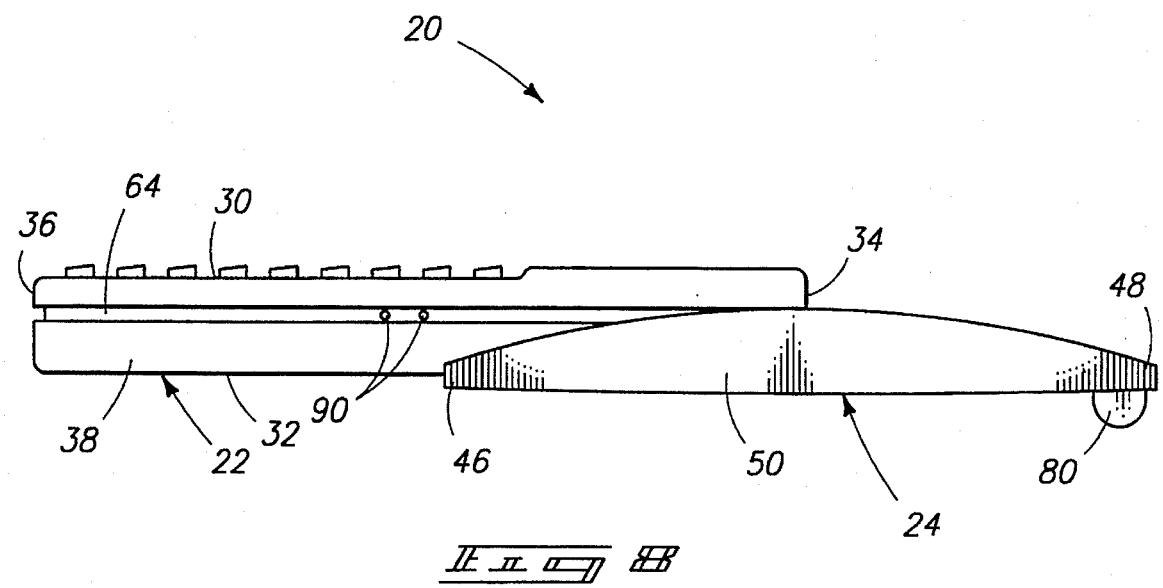
FIG. 8 is a side elevation view of the hand held calculator assembly which shows the cover at the intermediate position and pivoted fully around the calculator end to lie along the back side of the calculator.

At the intermediate position, the cover 24 is pivoted about the top end 34 from an initial parallel position where the cover overlies the calculator front (FIG. 6), through a substantially perpendicular position relative to the calculator (FIG. 7), to a subsequent parallel position where the calculator is aligned along the back (FIG. 8). During this pivotal movement, the pins remain station within the track guides and held at the top end by the raised bumps 92 in the guide tracks.

Figure 9:
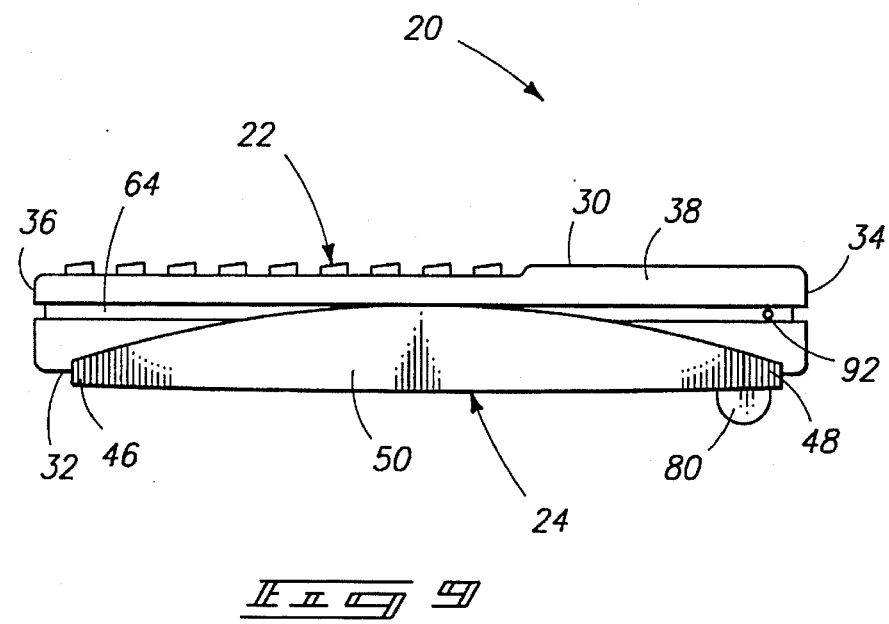
FIG. 9 is a side elevation view of the hand held calculator assembly which shows the cover displaced relative to the calculator to the retracted position.

The cover is then moved from the intermediate position of FIG. 8 to the second, retracted position of FIG. 9. The pins 60, 62 are pushed past the raised bumps 92 and slid within guide tracks 64 away from top end 34 back to the middle of the calculator where the pins are once again retained by detents 90. At the retracted position, the cover inner surface 42 is juxtaposed with the calculator back. To close the cover, the process of FIGS. 5–9 is simply reversed.

It is noted that the cover inner surface 42 remains in juxtaposition with the calculator throughout the entire movement between the closed and retracted positions. It is further noted that the cover can be retracted or closed by pivoting the cover about the bottom end 36 in a like manner.

Figure 10:
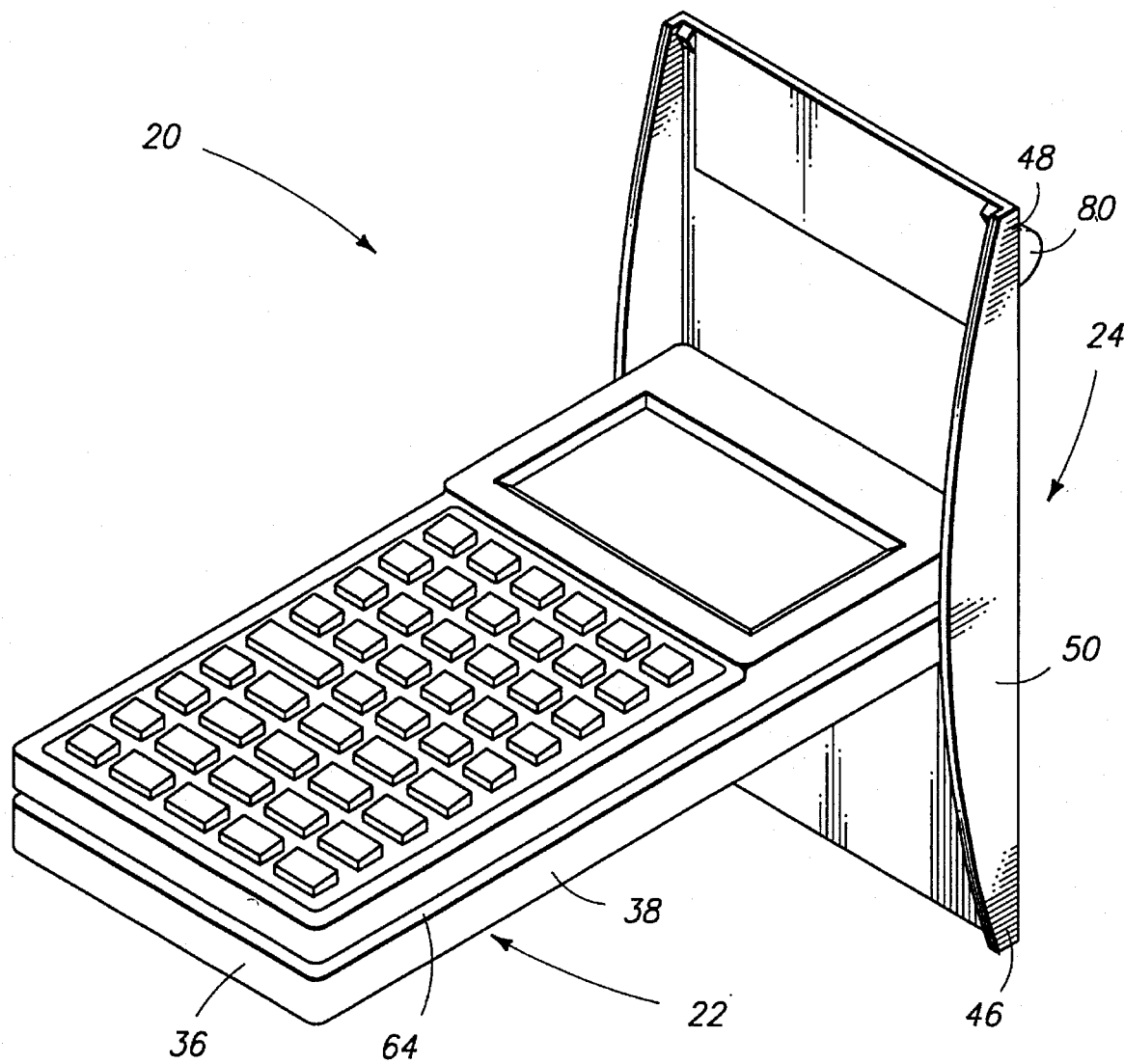
FIG. 10 is a perspective view of the hand held calculator assembly with the cover at the intermediate position and perpendicular to the calculator to thereby prop the calculator at a relatively steep inclined angle.
Figure 11:
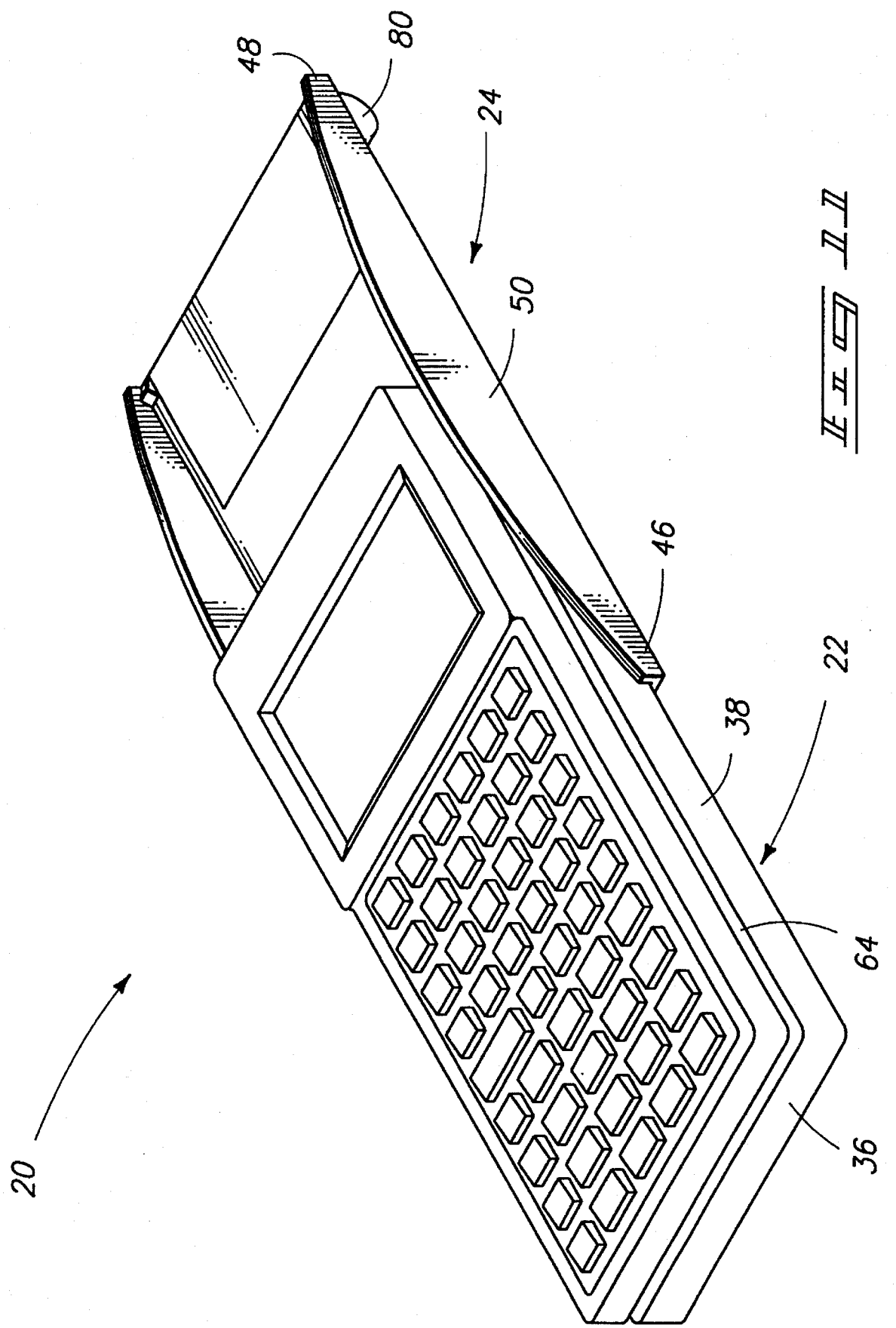
FIG. 11 is a perspective view of the hand held calculator assembly with the cover extended along the back side of the calculator to prop the calculator at a relatively slight inclined angle.

FIGS. 10 and 11 show two alternative propping angles that can be achieved by the cover, in addition to the propping angle shown in FIG. 2. In FIG. 10, the cover is at its intermediate position and approximately perpendicular to the calculator. The lower half of the cover is used to prop the calculator at a relatively steep incline in comparison to the moderately inclined angle of FIG. 2. By contrast, FIG. 11 shows the cover in an extended position along the back of the calculator. Here, the incline angle is relatively modest compared to both incline angles of FIGS. 2 and 10. Other angles of incline are also possible.

The calculator assembly of this invention is advantageous in that it provides a protective cover that can be retracted to an out-of-the-way position for hand operation, or used as a support to prop the calculator at an angle when set on a desk top. The cover remains permanently attached to the calculator, thereby eliminating the problems associated with covers being misplaced, lost or stolen.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A hand held calculator assembly comprising:
   a calculator having a front and a back, the calculator front having a keypad and a display; and
   a retractable cover slidably coupled to the calculator having a length effective to shield both the keypad and the display of the calculator, the cover having an inner surface and an exposed outer surface, the cover being movable between a first position where the cover inner surface is juxtaposed to and protects the calculator front and a second position where the cover inner surface is juxtaposed to the calculator back.

2. A hand held calculator assembly according to claim 1 wherein the cover has a raised support member to prop the calculator at an angle when the cover is at the second position.

3. A hand held calculator assembly according to claim 2 wherein the support member is formed of a skid-resistant material.

4. A hand held calculator assembly according to claim 2 wherein:
the cover has opposing ends; and
the support member is mounted on the outer surface and at one end of the cover.

5. A hand held calculator assembly comprising:
a calculator having a front and a back, the calculator front having a keypad and a display, the calculator having opposing ends; and
a retractable cover slidably coupled to the calculator, the cover having an inner surface and an exposed outer surface, the cover being movable between a first position where the cover inner surface is juxtaposed to, and protects at least a portion of, the calculator front and a second position where the cover inner surface is juxtaposed to the calculator back, the cover being pivoted about one of the ends of the calculator when moved between the first position and the second position so that the cover inner surface remains in juxtaposition with the calculator.

6. A hand held calculator assembly according to claim 5 wherein:
the calculator has a top end and a bottom end; and
the cover is pivoted about the top end of the calculator to an intermediate position between the first position and the second position, the cover supporting the calculator at an angle when the cover is at the intermediate position.

7. A hand held calculator assembly comprising:
a calculator having a front, a back, a top end, a bottom end, and two opposing sides, the calculator front having a keypad and a display, the opposing sides having guide tracks formed therein which run between the top and bottom ends;
a retractable cover to protect at least a portion of the calculator front, the cover having an inner surface and an exposed outer surface;
a pair of interconnecting pins slidably coupling the cover to the calculator, the pins being connected to the cover and slidably mounted within the guide tracks in the opposing sides of the calculator; and
the cover being movable between a first position where the cover inner surface is juxtaposed to the calculator front and a second position where the cover inner surface is juxtaposed to the calculator back, the cover being pivoted about one of the top or bottom ends of the calculator when moved between the first position and the second position so that the cover inner surface remains in juxtaposition with the calculator.

8. A hand held calculator assembly according to claim 7 wherein the pins and cover are integrally formed as a single unit.

9. A hand held calculator assembly according to claim 7 wherein:
the cover has opposing ends and opposing side walls; and
the pins are connected to the cover side walls at approximately midway between the opposing cover ends.

10. A hand held calculator assembly according to claim 7 wherein:
the cover has opposing side walls which extend over the sides of the calculator; and
the pins are connected to the cover side walls and project inwardly toward one another to slidably mount within the guide tracks of the opposing calculator sides.

11. A hand held calculator assembly according to claim 7 wherein:
the cover has opposing side walls which extend over the sides of the calculator;
the pins are connected to the cover side walls and project inwardly toward one another to slidably mount within the guide tracks of the opposing calculator sides;
the cover being movable from the first position to an intermediate position whereby the pins slide in their respective guide tracks toward one of the top or bottom ends of the calculator;
the cover being pivoted about said one top or bottom end of the calculator when the cover is at its intermediate position; and
the cover being movable from the intermediate position to the second position whereby the pins slide in their respective guide tracks away from said one top or bottom end of the calculator.

12. A hand held calculator assembly according to claim 7 wherein the cover has a length effective to shield the keypad and display of the calculator.

13. A hand held calculator assembly comprising:
a calculator having a front, a back, a top end, a bottom end, and two opposing sides, the calculator front having a keypad and a display, the opposing sides having guide tracks formed therein which run between the top and bottom ends;
a retractable cover to protect at least a portion of the calculator front, the cover having an inner surface and an exposed outer surface;
a pair of interconnecting pins slidably coupling the cover to the calculator, the pins being connected to the cover and slidably mounted within the guide tracks in the opposing sides of the calculator;
the cover being movable between a first position where the cover inner surface is juxtaposed to the calculator front and a second position where the cover inner surface is juxtaposed to the calculator back; and
raised bumps located in the guide tracks of the opposing sides of the calculator to positionally urge the pins to selected locations within the guide tracks that coincide with positions of the cover relative to the calculator.

14. A hand held calculator assembly comprising:
a calculator having a front, a back, a top end, a bottom end, and two opposing sides, the calculator front having a keypad and a display, the opposing sides having guide tracks formed therein which run between the top and bottom ends;
a retractable cover to protect at least a portion of the calculator front, the cover having an inner surface and an exposed outer surface;
a pair of interconnecting pins slidably coupling the cover to the calculator, the pins being connected to the cover and slidably mounted within the guide tracks in the opposing sides of the calculator;
the cover being movable between a first position where the cover inner surface is juxtaposed to the calculator front and a second position where the cover inner surface is juxtaposed to the calculator back; and
a raised support member mounted on the exposed outer surface of the cover to prop the calculator at an angle when the cover is at the second position.

15. A retractable cover for a hand held calculator, the calculator having a front and a back which extend along an elongated medial axis, the calculator front having a keypad and a display, the calculator further having two opposing sides with guide tracks formed therein, the retractable cover comprising:

a panel with a length effective to shield the keypad and the display of the calculator front; and a pair of pins connected to the panel and aligned along a pin axis that is perpendicular to the medial axis of the calculator, the pins being configured for slidable engagement within the guide tracks of the opposing calculator sides.

16. A retractable cover for a hand held calculator according to claim 15 further comprising opposing side walls extending substantially perpendicular from the panel to cover the opposing sides of the calculator, the pins being connected to the side walls and projecting inwardly toward one another.

17. A retractable cover for a hand held calculator according to claim 15 further comprising a raised support member on the panel adapted for propping the calculator at an angle.

* * * * *